(12) United States Patent
Caretta

(10) Patent No.: US 7,150,187 B2
(45) Date of Patent: Dec. 19, 2006

(54) SYSTEM AND METHOD FOR MONITORING DEFORMATIONS OF A MOVING TIRE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 16 days.

(21) Appl. No.: 10/432,221

(22) PCT Filed: Nov. 22, 2001

(86) PCT No.: PCT/EP01/13539

§ 371 (c)(1),
(2), (4) Date: Nov. 12, 2003

(87) PCT Pub. No.: WO02/42096

PCT Pub. Date: May 30, 2002

(65) Prior Publication Data

US 2004/0216520 A1 Nov. 4, 2004

Related U.S. Application Data

(60) Provisional application No. 60/262,634, filed on Jan. 22, 2001.

(30) Foreign Application Priority Data

Nov. 27, 2000 (EP) .................................. 00830778

(51) Int. Cl.
*G01M 17/02* (2006.01)
(52) U.S. Cl. ........................................................ 73/146
(58) Field of Classification Search ....... 73/146–146.8; 340/442–447
See application file for complete search history.

(56) References Cited

U.S. PATENT DOCUMENTS 5,247,831 A 9/1993 Fioravanti (Continued)

FOREIGN PATENT DOCUMENTS

DE 39 16 176 A1 11/1990

(Continued)

OTHER PUBLICATIONS

Celeri, F. et al., "A Method for the Evaluation of the Lateral Stability of Vehicles and Tires", Society of Automotive Engineers, International Automobile Tire Conference, Toronto, Canada, pp. 1-9, (Oct. 22-24, 1974).

(Continued)

*Primary Examiner*—Edward Lefkowitz
*Assistant Examiner*—Jermaine Jenkins
(74) *Attorney, Agent, or Firm*—Finnegan, Henderson, Farabow, Garrett & Dunner, L.L.P.

(57) ABSTRACT

A system for monitoring the deformations of a moving tyre fitted on a rim associated with a vehicle includes a moving station associated with the rim and a fixed station associated with the vehicle. The moving station includes a device for measuring the deformations in at least one predetermined direction, a unit for supplying power to the measuring device, and a device for enable the unit to supply the power. The fixed station receives information related to the deformation measurements from the moving station. A method for monitoring deformations of a moving tyre fitted on a rim includes enabling the moving station, activating the moving station to measure the deformations, and receiving information related to the deformation measurements. A related wheel for a vehicle includes a tyre, a rim, and the moving station.

42 Claims, 9 Drawing Sheets

U.S. PATENT DOCUMENTS

| | | | |
|---|---|---|---|
| 5,581,023 A * | 12/1996 | Handfield et al. | 73/146.5 |
| 6,275,148 B1 * | 8/2001 | Takamura et al. | 340/442 |
| 6,292,096 B1 * | 9/2001 | Munch et al. | 340/445 |
| 6,856,245 B1 * | 2/2005 | Smith et al. | 340/442 |
| 2002/0166371 A1 | 11/2002 | Ratti et al. | |
| 2003/0046992 A1 | 3/2003 | Caretta | |

FOREIGN PATENT DOCUMENTS

| | | |
|---|---|---|
| DE | 197 44 611 A1 | 4/1999 |
| EP | 0 689 950 A2 | 1/1996 |
| EP | 0 887 211 B1 | 12/1998 |
| WO | WO 93/25400 | 12/1993 |
| WO | WO 98/14338 | 4/1998 |
| WO | WO 01/08908 | 2/2001 |

OTHER PUBLICATIONS

English-language translation of DE 39 16 176 A1.
English-language translation of DE 197 44 611 A1.

* cited by examiner

SYSTEM AND METHOD FOR MONITORING DEFORMATIONS OF A MOVING TIRE

CROSS-REFERENCE TO RELATED APPLICATIONS

This application is a national-phase entry under 35 U.S.C. § 371 from International Application No. PCT/EP01/13539, filed Nov. 22, 2001, in the European Patent Office, the contents of which are relied upon and incorporated herein by reference; additionally, Applicant claims the right of priority under 35 U.S.C. § 119(a)–(d) based on patent application No. 00830778.7, filed Nov. 27, 2000, in the European Patent Office; further, Applicant claims the benefit under 35 U.S.C. § 119(e) based on provisional application No. 60/262,634, filed Jan. 22, 2001, in the U.S. Patent and Trademark Office.

BACKGROUND OF THE INVENTION

1. Field of the Invention

The present invention relates to a method and a system of monitoring the deformations of a moving tyre.

In particular, the present invention relates to the possibility of evaluating the deformations of the casing structure of a tyre from within the tyre, for example in order to permit automatic actions, actuated or commanded by the driver, on the vehicle steering and/or control system to modify its behaviour on the basis of measurements made on the tyre.

2. Description of the Related Art

There are known prior art devices for measuring characteristic parameters such as pressure and temperature within a tyre.

Patent application EP 0 887.211 describes a tyre monitoring system comprising a sensor, placed inside the tyre, which is enabled to create an electrical pulse during the passage of the said sensor through the footprint formed by the contact of the tyre with the ground during its rotation. The system described in this patent also comprises means for calculating the ratio of the duration of the said electrical pulse to the duration of one revolution of the tyre, and means for transmitting the said ratio to a processing unit within the vehicle. In particular, the sensor is placed within the tread of the tyre in such a way that the said electrical pulse has a first peak when the sensor enters the footprint area and a second peak when it leaves the footprint area.

According to the teaching of this patent, the ratio between the time elapsed between the two peaks and the period of a complete revolution of the tyre can be used to determine the flattening of the tyre during the running of the vehicle.

This is because the sensor detects the instant of entry into the footprint area and the instant of exit from this area. It is thus possible to measure the length of this area if the angular velocity and the radius of the tyre are known. The length of the footprint area is then related to the flattening of the tyre, which is a critical parameter for the operation of the tyre, particularly in the case of a tyre for heavy motor vehicles.

Patent application EP 0 689.950 describes a different method for monitoring parameters of a tyre such as its pressure and temperature. In particular, this invention uses a self-powered programmable electronic device which is placed on the inner surface of a tyre or on its rim. This device can be used to monitor and store the pressure, temperature, and number of rotations of the tyre, and can comprise an extensometer whose output signal measures the flexion of the inner surface of the tread, or an accelerometer which measures the value of acceleration to which the tread is subjected. Additionally, the device is activated by an external signal at radio frequency and transmits an alarm signal if a predetermined limit of the measured values is exceeded.

There are also known methods for measuring deformations of the tread of a tyre in movement and transmitting them to a receiver located in the vehicle. Patent application WO 93.25400 describes a sensor comprising a resonant circuit which oscillates at a predetermined characteristic frequency, placed inside the tread of a tyre and capable of directly transmitting a signal dependent on the aforesaid deformations. This resonance frequency is modified by the deformations of the tread during movement and the sensor transmits electromagnetic waves proportional to these variations of the resonant frequency. These electromagnetic waves are received by a processing unit connected to a receiver placed inside the vehicle.

U.S. Pat. No. 5,247,831 describes a method for monitoring the behaviour of the footprint area of a tyre during the running of the vehicle in order to optimize the driving of the vehicle. In particular, a piezoelectric sensor consisting of longitudinal strips of piezoresistive rubber is inserted into the tread. This sensor is capable of measuring the deformations of the tread because the strips change their electrical resistance as a function of the said deformations.

There are also known methods and devices for acting on the steering and/or control system of the vehicle, particularly on the devices which regulate the suspension systems of the vehicle, in order to control their behaviour in accordance with information obtained from the axles of the vehicle or from the wheel hubs.

The paper "A method for the evaluation of the lateral stability of vehicles and tires", produced by Società Pneumatici Pirelli S.p.A. and presented at the International Automobile Tyre Conference, Toronto, Canada, on 22 Oct. 1974, illustrates a way of determining the dynamic behaviour of the vehicle as a function of the forces developed by various types of pneumatic equipment and various conditions of the road surface.

The publication refers primarily to three forces which determine the dynamic behaviour of a tyre, namely the vertical force, the longitudinal force and the lateral force.

The vertical force is the force due to the dynamic load to which the tyre is subjected. The longitudinal force is the force due to the torque applied to the axle of the tyre as a result of the acceleration or braking of the vehicle. The lateral force, which is also present in normal running conditions in rectilinear travel, is the resultant of the forces due to the characteristic angles of the vehicle suspension (camber and toe-in) and to the angular thrust (ply-steer) developed by the layers of inclined cords of the belt structure of the tyre, and the thrust generated by the centrifugal force during side-slip. The sum of the forces developed by the four tyres generates a resultant system applied to the centre of gravity of the vehicle, which balances the inertial forces and determines the trim of the vehicle as a function of the characteristics of the suspension system of each axle. This resultant system is measured by suitable accelerometers positioned on the front and rear axle of the vehicle. The article includes a set of graphs which show the centripetal acceleration or the centripetal force applied to the centre of gravity of the vehicle as a function of the slip angle of the corresponding axle. Graphs plotted for various ground conditions and various types of tyre can be used to establish the behaviour of a vehicle provided with a predetermined set of tyres, and to measure any side-slip in cornering, on either the front or the rear axle.

SUMMARY OF THE INVENTION

The Applicant has observed that the aforesaid known systems of monitoring vehicle behaviour are based on systems of forces measured at the hubs of the wheels, and the systems of measuring tyre deformations are based on the measurement of the deformations undergone by the tread in the footprint area of the tyre.

The Applicant has observed that values measured in these systems do not have a one-to-one relationship with the operating conditions of the tyre, or, more precisely, with the system of forces developed by the tyre in each condition of travel.

The present invention is based on the Applicant's realization that the measurement of deformations of the tread, particularly in the footprint area of the tyre, cannot be used to identify the system of forces developed by the tyre or the deformations of the casing of the tyre related to it and representing the behaviour of the tyre. This behaviour is of considerable significance, especially during certain particular events, such as braking or acceleration of the vehicle, side-slipping, and variation of the load on the tyre.

Accordingly, the present invention has been developed from the Applicant's realization that the measurement of the deformations of the casing of the tyre, being related in a one-to-one way to the system of forces developed by the tyre during its use, can be used to determine the behaviour of the tyre regardless of its condition of movement.

It has now been found that the measurement of the deformation of the casing structure of the tyre, at a given inflation pressure, along a set of three Cartesian axes, in other words the deformation in the vertical direction, the deformation in the transverse direction and the deformation in the longitudinal direction, correspond in a one-to-one way, or at least in a reproducible way, to the vertical, lateral and longitudinal forces, respectively, acting on the tyre (or in other words to the forces which the tyre exchanges with the ground).

The Applicant has already described this technical solution and the measurements relating to it in Patent Application 99EP-114962.6, which should be consulted for further and more detailed information and which is to be considered as an integral part of the present document.

The present invention relates more specifically to a particular method and a particular type of device for making the aforesaid measurements.

The Applicant has discovered a new method for measuring the deformations of a moving tyre, in which the determination of these conditions takes place while the vehicle is in motion, without the necessity of being activated by a command external to the pneumatic-tyred wheel. In particular, a moving station which is associated with the said tyre and which makes these measurements is enabled by the movement of the tyre itself. For this purpose, the said moving station comprises a movement sensor.

This moving station is also preferably supplied with power from outside the tyre and this power supply is enabled by the said movement sensor.

In a first aspect, the present invention relates to a system for monitoring the deformations of a moving tyre fitted on a rim associated with a vehicle, characterized in that it comprises:

a moving station associated with the said rim, comprising
a device for measuring the deformations of the tyre in at least one predetermined direction,
a power supply unit for the said measurement device,
a device for enabling the said power supply unit,
a fixed station located in the said vehicle and capable of receiving the said measurement from the said moving station.

Preferably, the said fixed station is capable of activating the measurement made by the said moving station.

Preferably, the said power supply unit of the said moving station is supplied with electrical energy by the said fixed station.

Preferably, the said measurement is made at least once in each revolution of the said wheel.

In particular, the said fixed station comprises a fixed antenna which communicates with a moving antenna located on the said moving station.

Preferably, the said fixed antenna and the said moving antenna are inductively coupled to each other.

In particular, the said measurement device comprises an optical beam emitter device, a first lens, an optical beam receiver device and a second lens.

Preferably, the said measurement device comprises a reflective element placed on the said inner surface of the tyre, comprising a region having at least one area of high light reflection and an area of low light reflection.

In particular, the said area of high light reflection is produced by painting the inner surface of the tyre with a reflective paint.

Preferably, the said region comprises a plurality of triangles adjacent to each other.

In particular, the said fixed station comprises a supporting element, fixed at one of its ends to a hub on which the said rim is fitted, and an electronic circuit board, fixed to the said supporting element.

In particular, the said electronic circuit board of the fixed station comprises an oscillator circuit, which supplies a drive circuit for the said fixed antenna, a radio frequency receiver connected to the said fixed antenna and an electrical demodulator device connected to the said radio frequency receiver.

Preferably, the said fixed station is supplied by the battery of the vehicle on which the tyre is fitted.

In particular, the said moving station comprises a drive circuit for the said optical beam emitter and a drive circuit for the said optical beam receiver, and a circuit for reading the electrical signal emitted by the said optical beam receiver.

Alternatively, the said power supply unit of the said moving station is a battery.

Preferably, the said moving station comprises a sensor which measures the pressure of the said tyre.

Preferably, the said moving station comprises a sensor which measures the temperature of the said tyre.

Preferably, the said enabling device is an accelerometric switch.

In a further aspect, the present invention relates to a method for monitoring the deformations of a moving tyre fitted on a rim associated with a vehicle, characterized in that it comprises the following steps:

enabling a moving station associated with the said rim,
activating the said moving station associated with the said rim to make a measurement of the said deformations,
receiving this measurement.

Preferably, the said step of enabling the said moving station is carried out when the said tyre is moving.

Preferably, the said step of activating the said moving station comprises supplying power to the said moving station.

Preferably, the said step of activation is carried out by a fixed station positioned in the said vehicle.

In particular, the said step of activation enables the said moving station to make a measurement, this process comprising:
  emitting, from a predetermined position on the said rim, a signal in at least one predetermined direction within the tyre,
  reflecting this signal from the inner surface of the tyre,
  receiving this reflected signal.

Preferably, the said step of receiving this measurement comprises the step of transferring this measurement to the said fixed station.

Preferably, the said step of activating the said moving station comprises supplying power to the said moving station for a period which also includes the step of transferring the processed signal from the said moving station to the said fixed station.

In particular, the said step of activating the said moving station comprises generating a magnetic field at the said fixed station in the direction of the said moving station and supplying power by means of the said magnetic field to a drive circuit in the said moving station for an optical beam emitter.

In particular, the said step of transferring the said processed signal from the said moving station to the said fixed station comprises:
  generating a magnetic field corresponding to the said processed signal at the said moving station in the direction of the said fixed station,
  converting the said magnetic field into an electrical signal,
  decoding the said electrical signal in order to obtain the corresponding processed signal.

In a further aspect, the present invention relates to a wheel for vehicles, comprising a tyre fitted on a supporting rim associated with a vehicle, characterized in that it comprises a moving station associated with the said rim, comprising
  a device for measuring the deformations of the tyre in at least one predetermined direction,
  a power supply unit for the said measurement device,
  a device for enabling the said power supply unit.

Preferably, the measurement made by the said moving station is activated by a fixed station associated with the said vehicle.

Alternatively, the said power supply unit of the said moving station is a battery.

Preferably, the said moving station comprises a sensor which measures the pressure of the said tyre.

Preferably, the said moving station comprises a sensor which measures the temperature of the said tyre.

Preferably, the said enabling device is an accelerometric switch.

BRIEF DESCRIPTION OF THE DRAWINGS

Further characteristics and advantages of the present invention are disclosed, with further details, in the following description, with reference to the attached drawings, provided solely for explanatory purposes and without any restrictive intent, which show
  in FIG. 1, a cross section through a tyre fitted on its supporting rim under a static load;
in FIG. 12a, the inner surface of the liner of a tyre, in the footprint area of the tyre, showing a reflective element according to the embodiment of the moving station of FIG. 8;
in FIG. 12b, a schematic representation of an optical beam, sent by an optical beam emitter to the inner surface of the liner of a tyre, and reflected therefrom towards an optical beam receiver according to the embodiment of the moving station of FIG. 8;
in FIG. 12c, a schematic representation of an optical beam reflected from the inner surface of the liner of a tyre towards an optical beam receiver, with respect to a system of Cartesian axes according to the embodiment of the moving station of FIG. 8;
in FIG. 12d, a portion of the inner surface of the liner of a tyre, in the footprint area of the tyre, showing the displacement of a reflective element according to the embodiment of the moving station of FIG. 8.

DETAILED DESCRIPTION OF THE EMBODIMENTS

Figure 1:
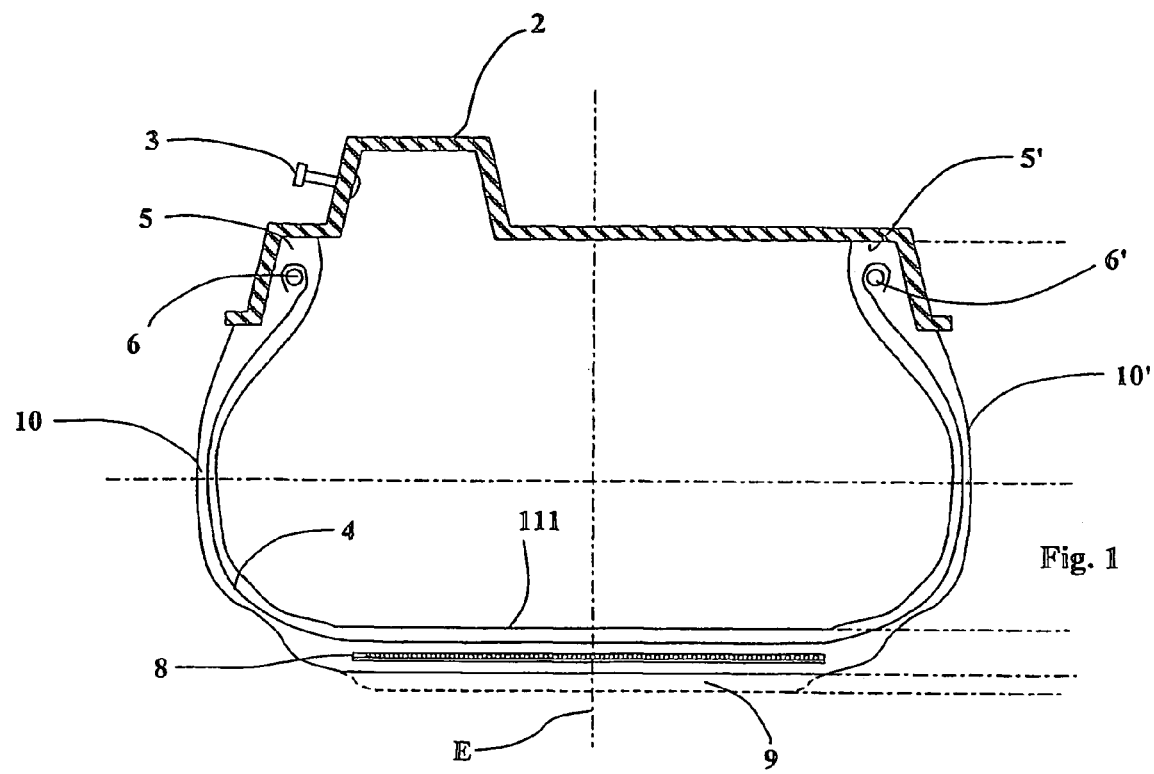

FIG. 1 shows by way of example a wheel comprising a tyre 1, of the type conventionally called "tubeless", in other words without an inner tube, and a supporting rim 2. This tyre 1 is inflated by means of an inflation valve 3, located by way of example, in a known way, on the channel of the said rim.

The tyre 1 consists of an internally hollow toroidal structure formed by a plurality of components, and primarily by a textile or metallic casing, having two beads 5 and 5' each formed along an inner circumferential edge of the casing for securing the tyre to the corresponding supporting rim 2. The said casing comprises at least one pair of annular reinforcing cores, called bead wires 6 and 6', which are circumferentially inextensible and are inserted in the said beads (usually with at least one bead wire per bead).

The casing comprises a supporting structure formed by a reinforcing ply 4 which includes textile or metallic cords, extending axially from one bead to the other according to a toroidal profile, and which has each of its ends associated with a corresponding bead wire.

In tyres of the type known as radial, the aforesaid cords lie essentially in planes containing the axis of rotation of the tyre.

On the crown of this casing there is placed an annular structure 8, known as the belt structure, normally consisting of one or more strips of rubberized fabric, wound on top of each other to form what is called a "belt package", and a tread 9 made from elastomeric material, wound around the belt package, and stamped with a relief pattern for the rolling contact of the tyre with the road. Additionally, two sidewalls 10 and 10', made from elastomeric material, each extending outwards in the radial direction from the outer edge of the corresponding bead, are placed on the casing, in lateral axially opposed positions.

In tyres of the type known as "tubeless", the inner surface of the casing is normally covered with what is called a "liner" 111, in other words one or more layers of airtight elastomeric material. Finally, the casing may comprise other known elements, such as edges, strips and fillers, according to the particular design of the tyre.

The combination of all these elements determines the mechanical characteristics of elasticity, rigidity and resistance to deformation of the tyre, which constitute the connection between the system of forces applied to the tyre and the extent of the corresponding deformations which it undergoes.

Figure 2:
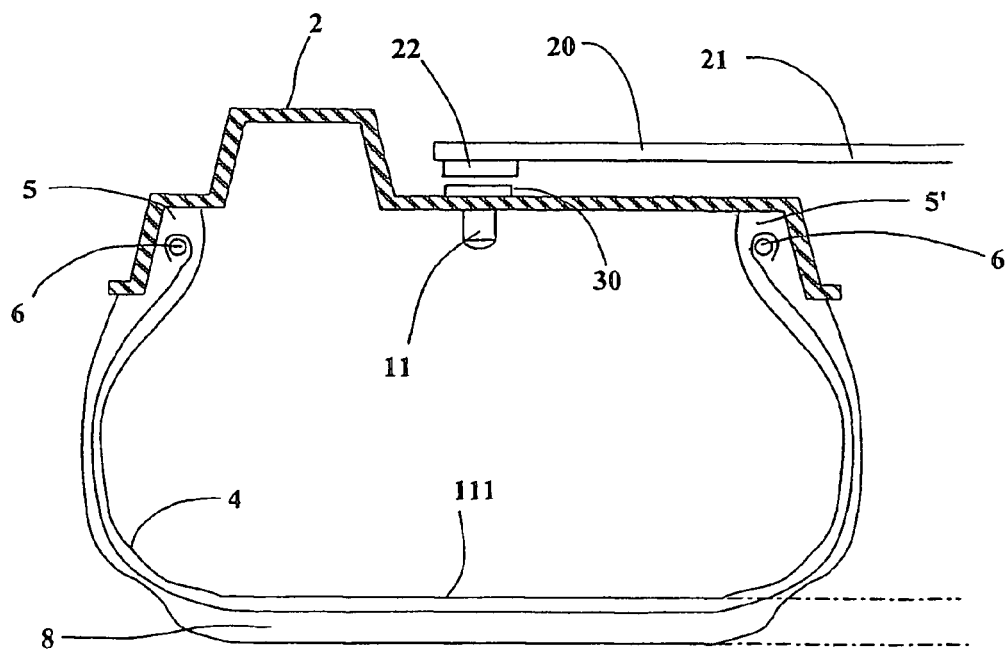
in FIG. 2, a detail of a pneumatic-tyred wheel showing the system of measuring the deformations of the tyre according to the present invention, comprising a moving station and a fixed station.

FIG. 2 shows, in a preferred embodiment of the invention, a system for monitoring the tyre of FIG. 1, fitted on the supporting rim 2 and associated with a vehicle. The system comprises a moving station 30, fitted in the wall of the supporting rim 2 and including a sensor/emitter 11 (called a "sensor" below for the sake of brevity), located within the cavity formed between the tyre and the rim, preferably along the mid-line plane of the said rim.

This moving station 30 comprises a transmitter which sends the measurements made by the said sensor/emitter 11 to a fixed station 20, located on the said vehicle and provided with a suitable receiver.

The fixed station is preferably associated with the corresponding hub of the vehicle by means of suitable supports which are described below.

The moving station and the fixed station communicate with each other in any convenient way, for example by, magnetic coupling between the two stations or by means of radio waves, preferably at high frequency.

Figure 3:
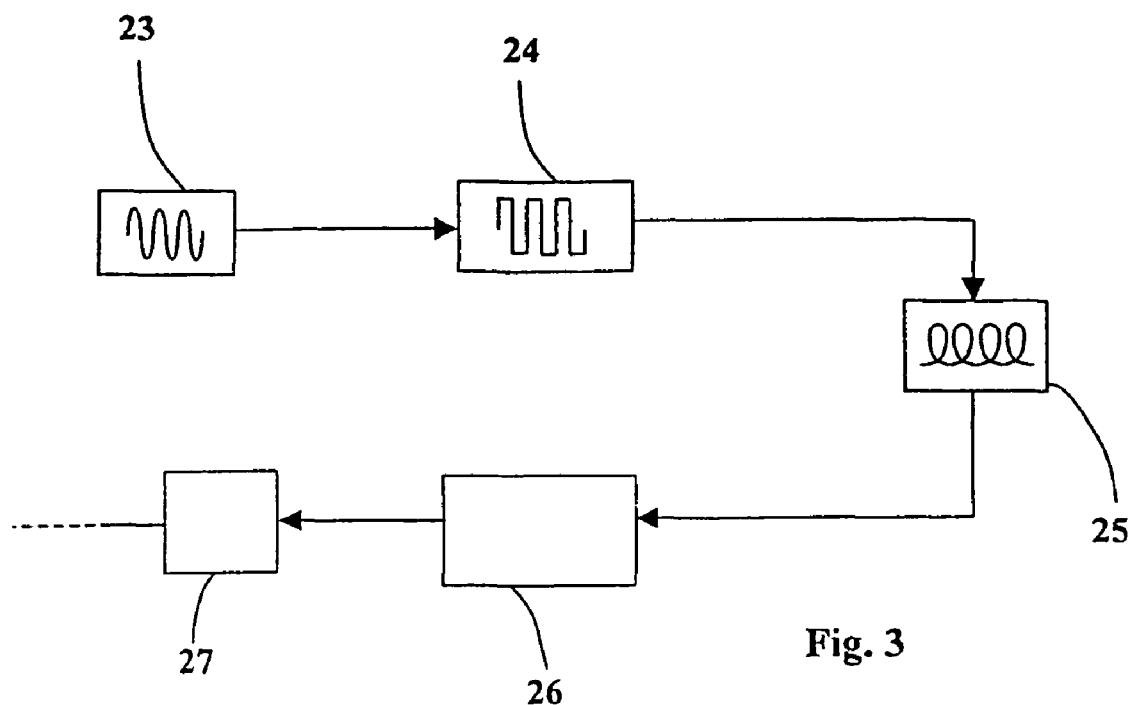
in FIG. 3, a block diagram of the electronic circuit inside the fixed station shown in FIG. 2.

In a preferred embodiment, the fixed station 20 comprises a supporting element 21, fixed at one of its ends to the hub of a wheel, and an electronic circuit board 22, placed preferably at the opposite end of the said supporting element, a block diagram of this circuit board being provided in FIG. 3.

In particular, the said electronic circuit board comprises an oscillator circuit 23, which supplies a drive circuit 24 for a first antenna 25, referred to below as the fixed antenna. The said circuit board also comprises a radio-frequency receiver 26 connected to the said antenna and an electrical demodulator device 27. The electrical power required to supply the said station can be advantageously provided directly by the vehicle battery through a suitable drive circuit (not shown).

Figure 4:
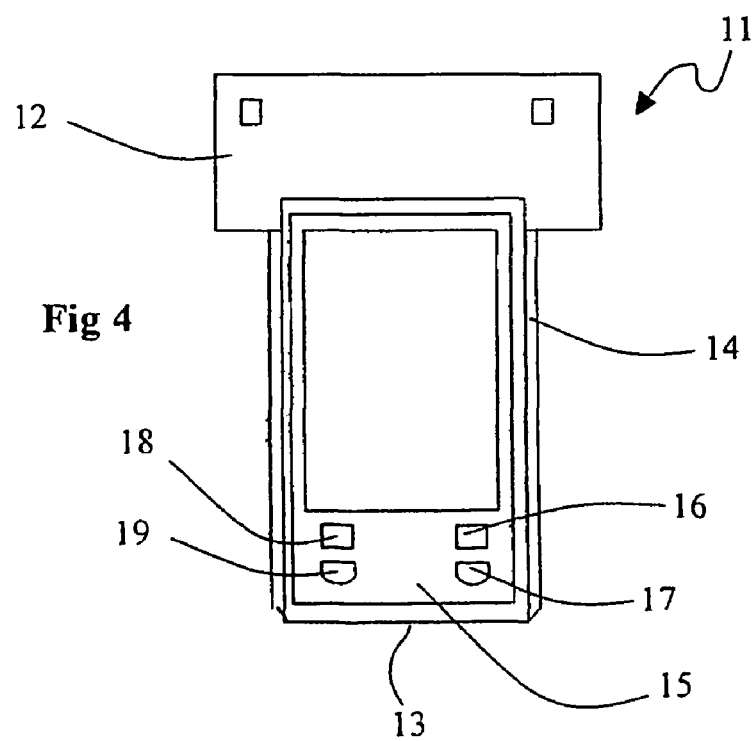
in FIG. 4, the moving station in detail, showing its components.

The moving station 30 shown in FIG. 4 comprises the sensor 11, which in turn comprises a hollow support 12, preferably made from plastic material, into which an externally threaded tube 13 is fitted, preferably by screwing. The external thread 14 of the tube 13 is used both for fitting the tube into the support and for fixing the whole station into the wall of the supporting rim 2 of the wheel. Alternatively, the wall of the support can be threaded both externally, for fixing the station into the wall of the rim, and internally, to enable the tube 13 to be fitted. The main function of the support 12 is to form an airtight plug for sealing the hole formed in the body of the rim 2.

An electronic circuit board 15, with which are associated an optical beam emitting device 16, a first lens 17, an optical beam receiving device 18, and a second lens 19, is fitted into the tube 13.

Figure 6:
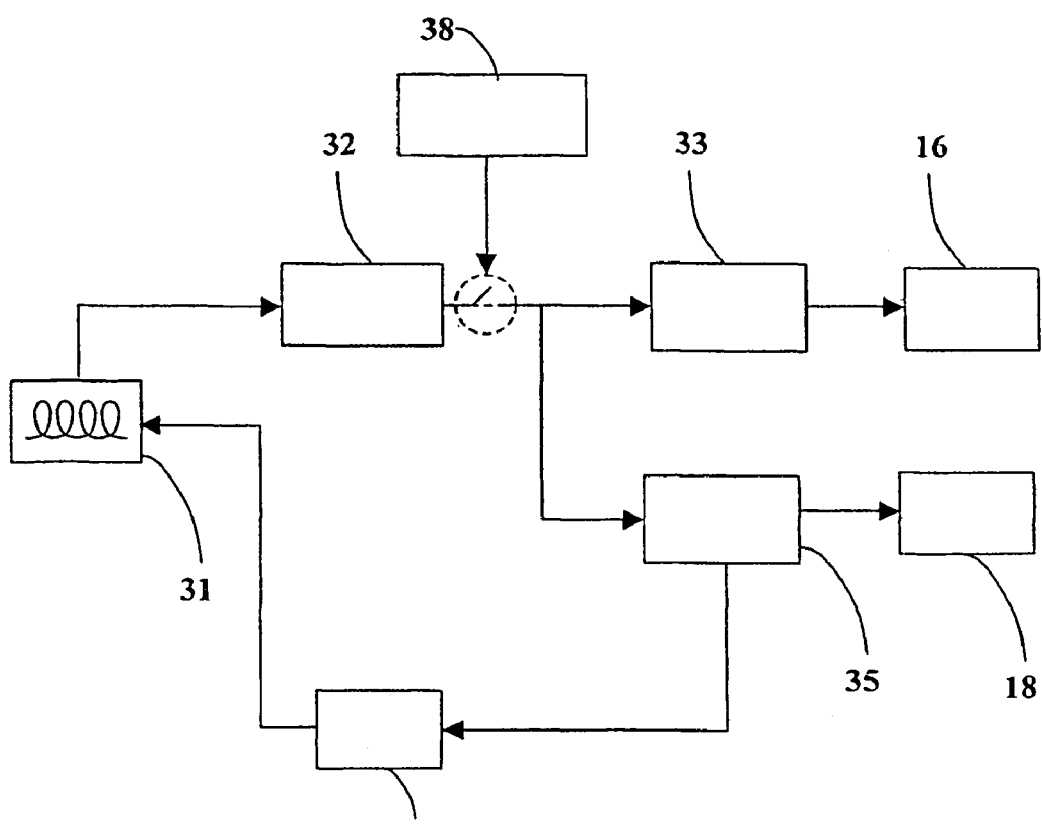
in FIG. 6, a block diagram of the moving station according to the present invention.

The electronic circuit board 15, the block diagram of which is shown in FIG. 6, also comprises a second antenna 31, called the "moving antenna" below, connected to a power supply unit 32, which supplies the electrical power to the optical beam emitting device 16 and to the optical beam receiving device 18. For this purpose, the moving station comprises a drive circuit 33 for the said emitter 16 and a drive circuit 35 for the said receiver 18. This electronic circuit board also comprises a circuit 37 for reading the signal received by the said receiver 18, the output of this circuit being connected to the said moving antenna 31.

The electronic circuit board also comprises a device for enabling the power supply to the board. In particular, this device comprises an accelerometric switch 38 which is sensitive to the movement of the wheel in which the said moving station is fitted. This accelerometric switch is preferably connected after the said power supply unit 32, in such a way that the electrical connection between the said power supply unit 32 and the optical beam emitter device 16 is open when the wheel is not moving and closed when the wheel is moving.

Figure 5:
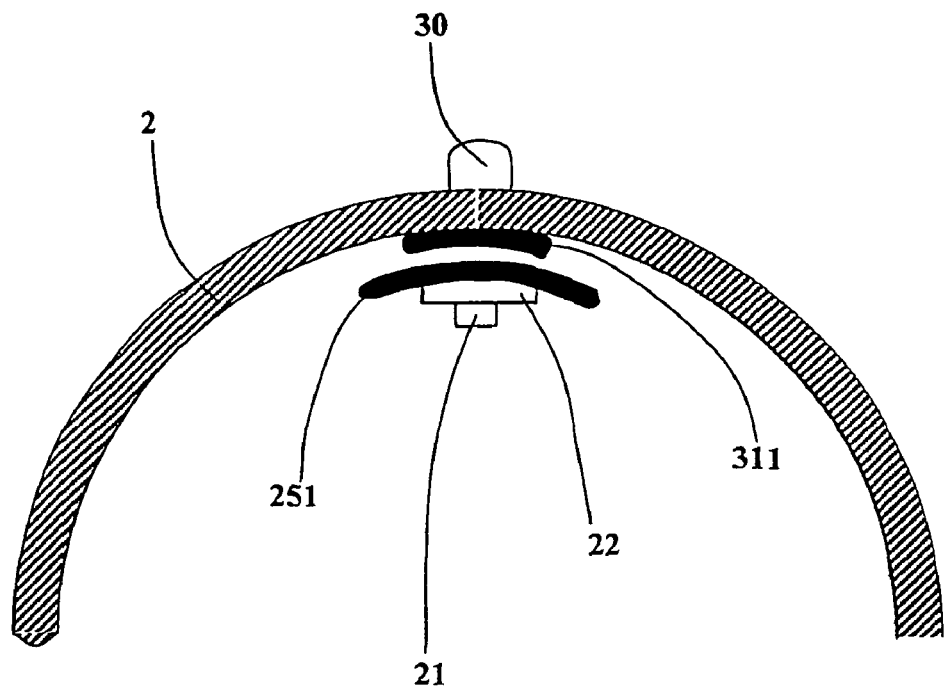
in FIG. 5, a detail of the wheel according to the present invention, showing in particular the area of coupling between an antenna located on the fixed station and an antenna located in the moving station.

In the preferred example of an embodiment described above, the communication between the said moving station and the said fixed station is provided by means of magnetic coupling: in other words, the fixed antenna and the moving antenna preferably each comprise an inductive circuit, and the signal exchanged between the two antennas is a magnetic signal. In particular, with reference to FIG. 5, the fixed antenna comprises a fixed coil 251, supplied with an alternating radio-frequency current generated by the drive circuit, and the moving antenna comprises a moving coil 311 which is integral with the rim 2 of the wheel.

With each rotation of the pneumatic-tyred wheel, the moving coil 311 is brought to a position facing the fixed coil 251, thus intercepting the magnetic field generated by the aforesaid coil. A corresponding electrical voltage is induced in the moving coil 311, is stored by the said power supply unit 32, and supplies the energy required for the operation of the moving station as a whole. This power supply unit 32 preferably comprises, in a known way, a bridge of diodes or equivalent devices capable of converting a sinusoidal current to a continuous current. The current produced in this way supplies the optical beam emitting device and the optical beam receiving device. In particular, this current supplies the drive devices 33 and 35.

Within the time interval during which the moving coil and the fixed coil are facing each other, the moving station is activated to make preferably at least one of the specified measurements on the tyre, and sends, by means of the moving coil, a signal corresponding to the measurement which has been made. A voltage corresponding to the measurement made is induced in the fixed coil, as explained in greater detail below.

More precisely, the pair of antennas are responsible for transferring between the fixed station and the moving station the electrical power required to supply the moving station, and also for transferring between the fixed station and the moving station the data on the measurements made in the tyre.

For the purposes of the present invention, the term "enable" means to make the system capable of making the measurement; in particular, to "enable" means to connect a power supply device to a consumer device, or in other words, in the case in question, to connect the said power supply unit of the said moving station to the said drive circuits of the said station.

The said enabling is carried out when the wheel is moving. In other words, the said drive circuits are active only when the wheel is moving.

For the purposes of the present invention, the term "activate" means to make measurement devices operative; in particular, to "activate" means to supply power to the said moving station, in other words to transfer electrical energy from the said power supply unit to the said drive devices in order to make the specified measurement.

Preferably, the moving station is activated by the fixed station to make the measurement of the deformations of the tyre.

Preferably, the information is transmitted in the form of a signal modulating the alternating power supply voltage of the fixed coil.

The device enabling the power supply checks that the voltage induced in the moving coil of the said moving station is caused by an actual movement of the wheel, and enables the supply of the optical part, particularly the supply of the optical beam emitter device.

This prevents the accidental enabling of the supply to the moving station, due for example to external magnetic fields induced in a random way. A further example of accidental enabling may occur when the vehicle remains stationary for longer than a specified time; in this situation, the antenna of the fixed station and the antenna of the moving station may be located in positions facing each other. This could give rise to an undesired induced voltage in the moving coil, which could activate the optical beam emitter and therefore cause the aforesaid measurements to be made in the tyre in static conditions, in other words in conditions in which the vehicle and the wheels are not moving. In static conditions, the deformations of the tyre do not represent a data element which is significant for the purposes of controlling the behaviour of the tyre and therefore of the vehicle. When the vehicle and tyres are stationary, examples of useful information may be the value of the inflation pressure or the static load bearing on each tyre. Additionally, the fact that enabling takes place only when the tyre is moving makes it possible to extend the life of the electronic circuit boards and the optical part of the moving station, since this is supplied only for the limited periods in which the measurements are made.

Alternatively, the said power supply unit in the moving station can be a battery, in which case the antennas can be used to time the measurement and to transfer the signal containing the measurements made from the moving station to the fixed station. The said accelerometer disconnects the battery of the said moving station, so that the whole of the moving station is disabled when the vehicle is stationary for a time exceeding a specified value; this has the additional purpose of extending the battery life. As a further alternative to the presence of the antennas, the measurement can be activated by a timing device which can cause the said specified measurement to be made at specified time intervals. This timing device can also disconnect the battery in the intervals of time in which the measurement is not being made, in order to extend the battery life further.

Clearly, many other equivalent systems can also be used for the transfer of the information.

In the embodiment described above, as has been said, the sensor comprises both the signal emitting element and the element receiving the reflected signal. It should be understood that the two functions can be carried out by two independent elements which are separate from each other, or by a single element which combines them both, according to the specific technology used.

Figure 7:
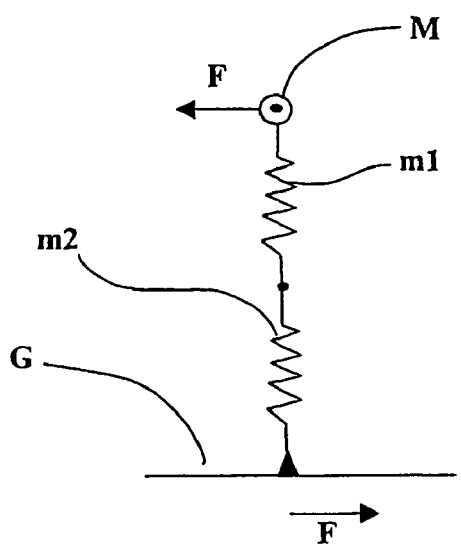
in FIG. 7, a schematic representation of a pneumatic-tyred wheeler.

The signal emitted by the sensor 11 can be selected from a wide range of types of usable signals: preferably, those in the form of sound waves are used, for example ultrasounds, or electromagnetic waves, which are reflected from the inner surface of the tyre. FIG. 7 is a schematic representation of the structure of a pneumatic-tyred wheel with two springs m1 and m2 mounted in series between the vehicle's hub M and the ground surface G.

The spring m1 represents the casing structure of the tyre, while the spring m2 represents the structure of the tread, which has a specific elasticity dependent on the visco-elastic characteristics of the mixture and on the geometrical characteristics of the tread design.

The force F applied to the footprint area of the tyre is balanced by an equal and opposite force F applied to the hub of the wheel. Unless the behaviour of m1 (m2) is known, it is not possible to know the value of the deformation caused by the force acting on m1 (m2), and vice versa.

The forces transmitted by the tyre to the ground in a given situation, whether static or dynamic, are associated with the deformations of the tyre, in other words with the deviations of the profile of the casing in operation from the simple inflation profile of the casing.

The profile of the casing in operation is also denoted here by the term "deformed state of the casing", while the simple inflation profile of the casing, in other words that of the casing in the tyre fitted on the rim on which it is used and inflated to its nominal operating pressure, in the absence of a load, is denoted here, albeit incorrectly, as the equilibrium profile.

For the purposes of the present invention, the casing profile is defined as the profile according to the neutral axis of the casing plies in the cross section of the tyre. In particular, the casing profile describes the deformed state of the said tyre under the effect of the system of forces acting on it.

It is not possible to deduce the deformed state of the casing in a unique way from measurements made on the footprint area. Similarly, it is not possible to find the deformation of the footprint area in a unique way from the deformed state of the casing, since the deformation depends on parameters which are frequently unknown, particularly the value of the coefficient of friction between the tyre and the ground.

The Applicant has perceived that the deformed casing profile, at a given inflation pressure, provides a description of the actual behaviour of the tyre in motion. Other significant parameters for the interpretation of the measurements of the deformations of the tyre are the value of the inflation pressure of the tyre, the temperature of the fluid within the tyre, and its velocity or acceleration.

The deformations of the casing profile considered for the purposes of the present invention are defined as follows:

flattening ($X_1$): the deformation directed along a vertical axis or in any case along an axis perpendicular to the road surface;

lateral displacement, or skidding, or slip ($X_2$): the deformation directed along the axis of rotation of the tyre;

longitudinal creep or torsion ($X_3$): the deformation directed along the circumferential direction, in other words the direction of rolling of the tyre.

A more detailed description of the relations between the said values and the behaviour of a tyre is given in the aforesaid patent application 99EP-114962.6 in the name of the present Applicant.

The measurement of these deformations is expressed as a variation of $X_1$, $X_2$, $X_3$ with respect to corresponding values determined on the equilibrium profile of the tyre at a specific inflation pressure.

The inner surface of the tyre, particularly the component called the "liner", interacts with the sensor 11 in the determination of $X_1$, $X_2$, and $X_3$.

Figure 8:
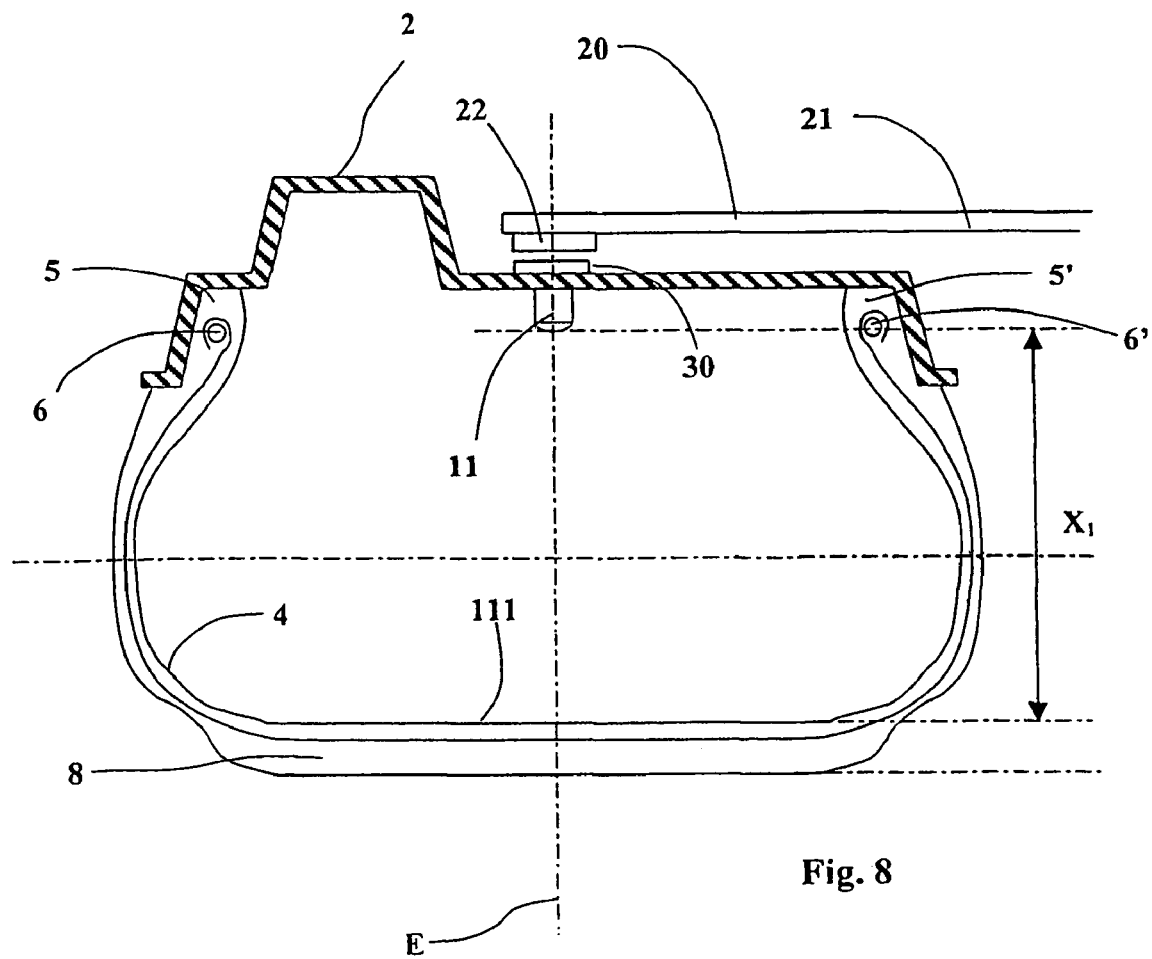
in FIG. 8, a cross section through a tyre fitted on its supporting rim, showing a system of monitoring the deformation in the vertical direction (in other words the flattening deformation) according to the invention.

In FIG. 8, the distance $X_1$ corresponds to the distance between the surface of the liner 111 and the sensor 11 in the direction of the radius of rolling of the tyre.

Figure 9:
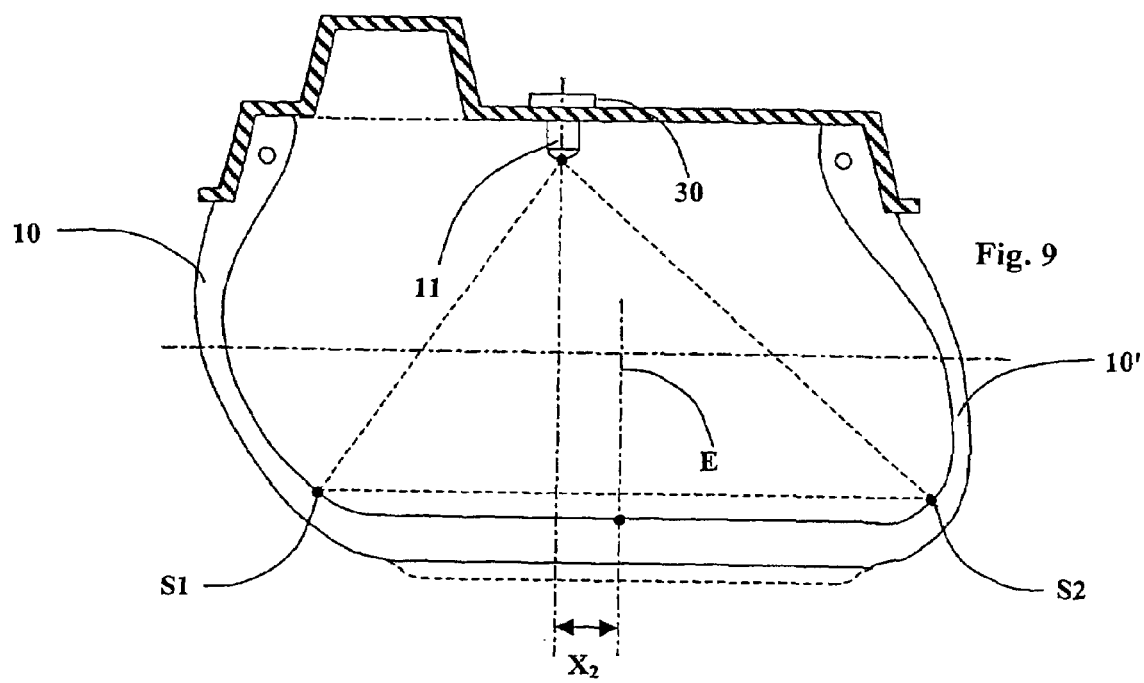
in FIG. 9, a longitudinal section through a tyre fitted on its supporting rim in side-slip conditions, showing a system of monitoring the deformations in the lateral direction (in other words the lateral displacement deformation) according to the invention.

In FIG. 9, the distance $X_2$ corresponds to the displacement in the transverse direction of the point of projection of the sensor 11 on the surface of the liner 111, with respect to the point of intersection of the surface of the liner with the equatorial plane E.

Figure 10:
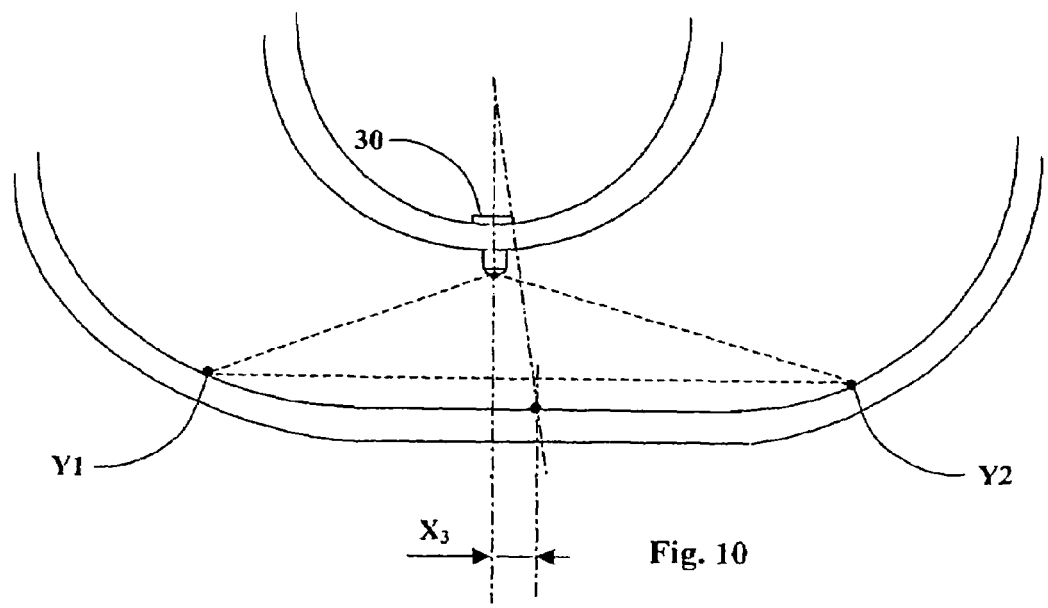
in FIG. 10, a longitudinal section through a tyre fitted on its supporting rim in braking conditions, showing a system of monitoring the deformations in the longitudinal direction (in other words the longitudinal displacement deformation) according to the invention.

In FIG. 10, the distance $X_3$ corresponds to the displacement in the circumferential direction of the point of projection of the sensor 11 on the surface of the liner 111, along the equatorial plane, with respect to the point of the surface of the liner lying in the centre of the footprint area.

For the purpose of measuring these distances, the sensor 11 emits a signal which is reflected from the liner with an intensity which differs according to its position with respect to the sensor. The reflection time of the signal can be measured in combination with the measurement of the intensity, or as an alternative to it. The reflected signal received by the sensor is suitably encoded in such a way as to determine the values of $X_1$, $X_2$ and $X_3$.

Advantageously, the reflected signals can be encoded in the sensor itself. For example, the sensor can emit a plurality of optical beams towards predetermined points on the surface of the liner.

Figure 11A:
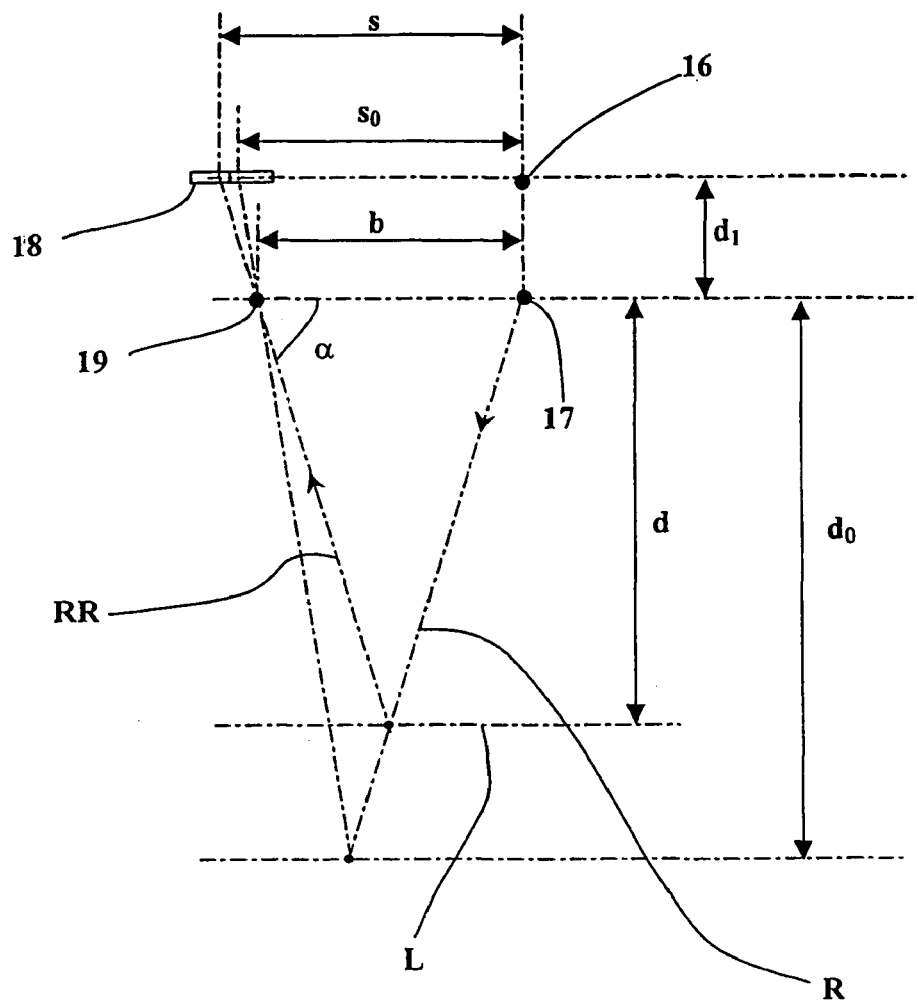
in FIGS. 11a–b, an operational diagram of an optical measurement system used by the moving station of FIG. 6 in one embodiment of the invention.
Figure 11B:
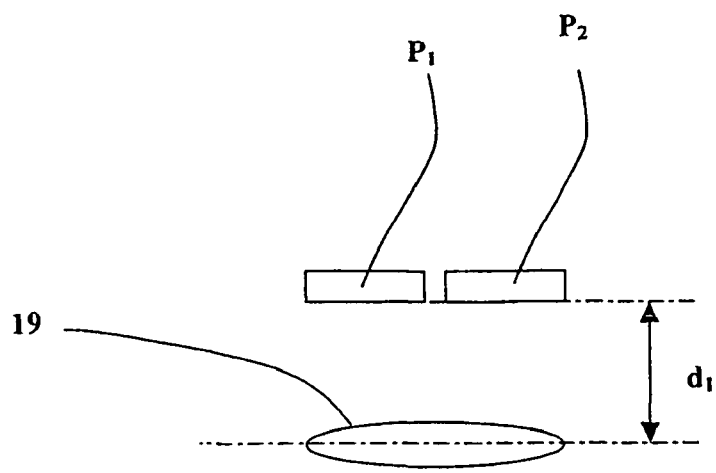

FIGS. 11a and 11b show a first embodiment of the said device for measuring the deformations of the tyre; in this embodiment, the said optical beam emitting device 16 of FIG. 6 is an LED which emits an optical beam of infrared light. Preferably, the optical beam receiving device 18 of FIG. 6 is formed by a pair of p-i-n diodes P1 and P2 adjacent to each other.

With reference to the diagrams in FIGS. 11a and 11b, the optical beam emitting device (LED) 16 emits an optical beam R collimated by the first lens 17, directed towards a predetermined point of the surface of the liner, preferably selected within the footprint area of the tyre. The ray RR reflected from the surface L of the tyre liner reaches the optical beam receiving device 18 (the pair of p-i-n diodes) at an angle α dependent on the distance d of the surface of the liner from the emission point.

The optical beam receiving device comprises the second lens 19 and the pair of adjacent p-i-n diodes P1 and P2. The optical beam collimated by the lens 19 is focused on these diodes. As the distance d between the surface of the liner and the lens 19 varies, the angle of the reflected ray RR changes and the surface area of the diodes struck by the optical beam changes as a result. In particular, there is a change in the ratio of the quantity of light incident on one diode to that incident on the other. This ratio is therefore proportional to the distance between the lens and the surface which produces the reflection, in this case the surface of the liner.

In particular, in FIG. 11a, s represents the distance between the position of the emitting device (LED) and the point of arrival of the reflected beam RR on the surface of the p-i-n diodes, b represents the distance between the emitting device and the position of the lens 19, and $d_1$ represents the distance between the pair of p-i-n diodes and the lens 19. Assuming that the distance $d-d_0 \ll d$, in other words that the variation of the distance d is very small with respect to the initial value of the distance d, the following relation is true:

$$d - d_0 = (s - s_0)*d/b*d/d_1 \qquad (1)$$

and therefore:

$$s - s_0 = (d - d_0)/d*d_1/d*b \qquad (2)$$

Each of the p-i-n diodes generates an electrical signal, the difference between which is proportional to the distance $s-s_0$ and therefore to the variation of the distance d.

The device 37 for reading the electrical signal generated by the p-i-n diodes determines this difference, and sends a corresponding electrical signal via the antenna 31 to the fixed station. This signal transmission takes place because, in practice, the signal corresponding to the aforesaid difference carries out an amplitude modulation of the sinusoidal current induced in the moving coil. This amplitude modulation creates a variation of the magnetic field which is detected by the fixed coil by means of the radio-frequency receiver 26. A signal corresponding to the aforesaid amplitude modulation is extracted from this coil by means of the demodulator 27 and is sent to the vehicle for the specified purposes.

The measurement of the distance d can be used to determine the aforesaid distances $x_1$, $x_2$ and $x_3$, and their variations.

In FIG. 9, a first optical beam is directed towards a point $S_1$ on the sidewall 10 of the tyre, and a second optical beam is directed towards a point $S_2$ of the opposite sidewall 10'. The optical beams are orientated in such a way that the points $S_1$ and $S_2$ are on the same horizontal plane. Each of the two measured distances represents the distance of the sensor 11 from the corresponding sidewall in the direction of the optical beam which is emitted. $X_2$ can be calculated by comparing the measurements of these two distances with each other, if the angles of emission of the optical beams are known.

In FIG. 10, a first optical beam is directed towards a point $Y_1$ on the surface of the liner on the equatorial plane of the tyre. This point $Y_1$ is in the proximity of the start of the footprint area in the direction of advance of the tyre. A second optical beam is directed towards a point $Y_2$ on the surface of the liner on the equatorial plane of the tyre. This point is in the proximity of the exit from the footprint area, in other words in the direction opposite to the direction of advance of the tyre. Additionally, the optical beams are orientated in such a way that the points $Y_1$ and $Y_2$ are on the same horizontal plane.

Each of the two measured distances represents the distance of the sensor 11 from the corresponding point $Y_1$ or $Y_2$ in the direction of the emitted optical beam.

$X_3$ can be calculated by comparing the measurements of these two distances with each other, if the angles of emission of the optical beams are known.

To measure $X_1$, it is simply necessary to send a single beam in the direction shown in FIG. 8 from the equatorial plane of the tyre E.

Alternatively, instead of measuring the distance between two points, the sensor can carry out an integration of different measurements between adjacent points, thus reconstructing the shape of an extended portion of the inner surface of the tyre.

The reflection obtained from the inner surface of the tyre is particularly convenient, since it does not require modifications to the structure of the tyre and to its manufacturing process, as no reflective elements have to be added to or formed in the aforesaid surface.

FIGS. 12a–d show a further embodiment of the said device for measuring the deformations of the tyre; in this embodiment, the optical beam emitter device 16 is an LED and the optical beam receiver device 18 is formed by a linear CCD (charge coupled device) comprising a plurality of adjacent diodes. Alternatively, this receiver can be a CMOS (complementary metal oxide silicon) element or other linear semiconductor sensor.

Figure 12A:
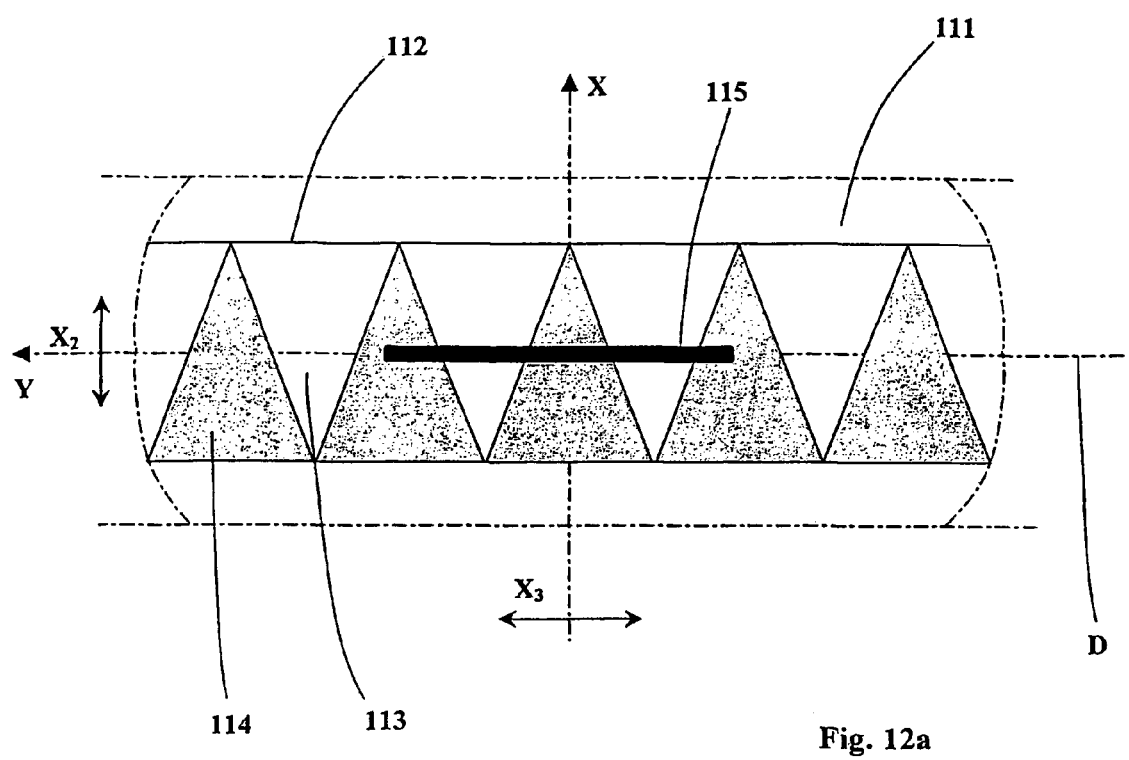
in FIGS. 12a–d, an operational diagram of an optical measurement system used by the moving station of FIG. 6 in another embodiment of the invention; in particular, the following are shown.

The inner surface of the liner 111 has a reflective element, shown in particular in FIG. 12a, comprising a region 112, preferably of rectangular shape and having a length, in the longitudinal direction of advance of the tyre, essentially equal to the length of the footprint area of the tyre. This reflective element is placed opposite the said moving station in such a way that the optical beam emitter device, when activated, sends its beam to the centre of the said region 112.

The region 112 comprises areas of high reflectivity 113 alternating with areas of low reflectivity 114. For the purposes of the present invention, an area of high reflectivity preferably reflects at least 100% more of the light sent from the LED than the area of low reflectivity. These areas are triangles in the described embodiment; alternatively, these areas can be trapezia. More generally, these areas can be of any shape, provided that, on the plane of the liner surface, they form an alternation of areas of high reflectivity and areas of low reflectivity both in the longitudinal direction of advance of the tyre and in the directional orthogonal thereto.

The aforesaid region is placed within the liner surface, preferably in a central position, and in particular centrally with respect to an axis D which represents the intersection of the equatorial plane of the tyre with the surface of the footprint area.

The alternation of areas of high reflectivity and areas of low reflectivity can be obtained by painting the areas of high reflectivity with, for example, reflective paints, and leaving the areas of low reflectivity unaltered, thus maintaining in these areas the original dark colour of the mixture from which the liner layer is made. A method for printing symbols on rubber articles, particularly tyres, in which the symbol is applied in a colour suitable for the purpose of forming these areas of high reflectivity, is described in patent application 97WO-EP05196 in the name of the present Applicant.

Figure 12B:
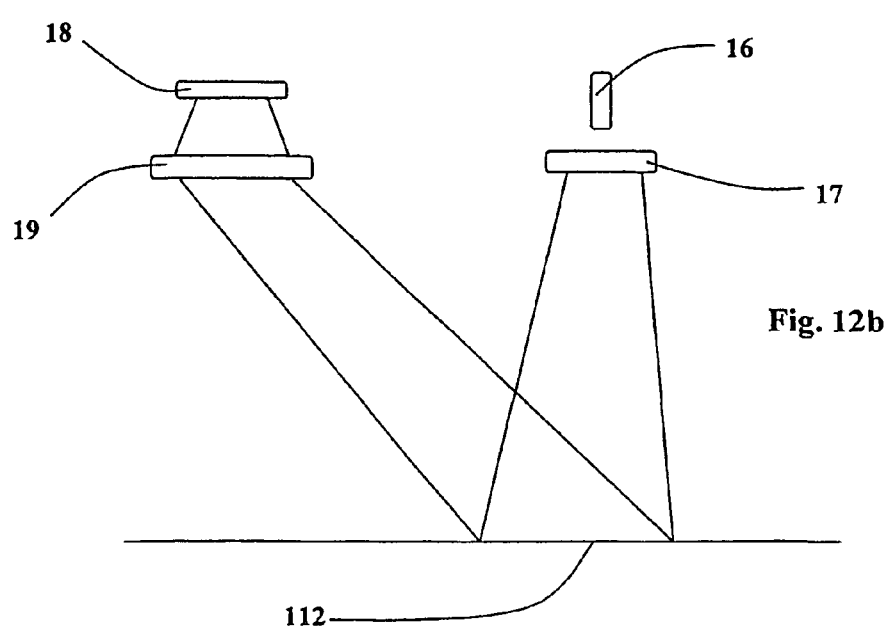
Figure 12C:
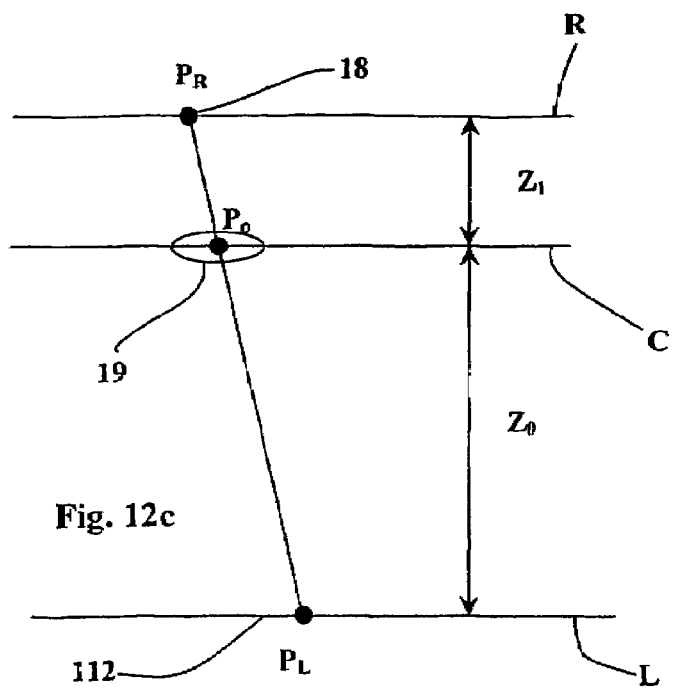

With reference to the diagrams in FIGS. 12a, 12b and 12c, the optical beam emitter device (LED) emits an optical beam, collimated by the first lens 17, towards the surface of the liner, preferably in the footprint area of the tyre, and illuminates the region of alternating reflectivity 112.

The rays reflected by the region 112 of the tyre liner reach the optical beam receiver device 18 by passing through the second collimating lens 19, which enables the CCD to receive the rays reflected from the region 112. FIG. 12a shows a rectangle 115 which corresponds to the area which the CCD scans through the lens 19.

The device 37 for reading the electrical signal generated by the CCD element sends a corresponding electrical signal via the antenna 31 to the fixed station. This signal transmission takes place because, in practice, the signal corresponding to the aforesaid difference carries out an amplitude modulation on the sinusoidal current induced in the moving coil. This amplitude modulation creates a variation of the magnetic field which is detected by the fixed coil by means of the radio-frequency receiver 26. A signal corresponding to the aforesaid amplitude modulation is extracted from this coil by means of the demodulator 27 and is sent to the vehicle for the specified purposes.

FIG. 12c shows a plane L of the liner surface, a horizontal plane C passing through the centre of the lens 19 and a horizontal plane R passing through the receiving surface of the CCD.

The origin of the Cartesian axes x, y, z is the point $P_0$ (0,0,0) corresponding to the centre of the lens 19, the x axis represents the transverse direction, the y axis represents the longitudinal direction, and the z axis represents the vertical direction. The reflection point $P_L$ on the region 112 has the co-ordinates (x,y,$z_0$) where $z_0$ is the distance of the liner surface from the lens 19 in the vertical direction. The reading point $P_R$ on the plane of the CCD, corresponding to the reflection point $P_L$, has the co-ordinates $$\left(-x\frac{Z_1}{Z_0}, -y\frac{Z_1}{Z_0}, Z_1\right). \quad 1)$$

Let us assume that the region 112 on the liner surface, also called the image plane, is at an unknown distance $x_1$, and has undergone a lateral displacement of $x_2$ and a longitudinal creep of $x_3$. The values of $x_1$, $x_2$ and $x_3$ are to be found by measurement with the CCD element.

The CCD element is positioned in the longitudinal direction y, and therefore the reading of the reflected optical beams is reduced to the reading of at least three points located along the said y axis. FIG. 12a shows a reading area 115 of the CCD element having an essentially rectangular shape. This rectangular shape, due to the small dimensions of the CCD with respect to the design formed on the liner surface, can be approximated to a segment.

Figure 12D:
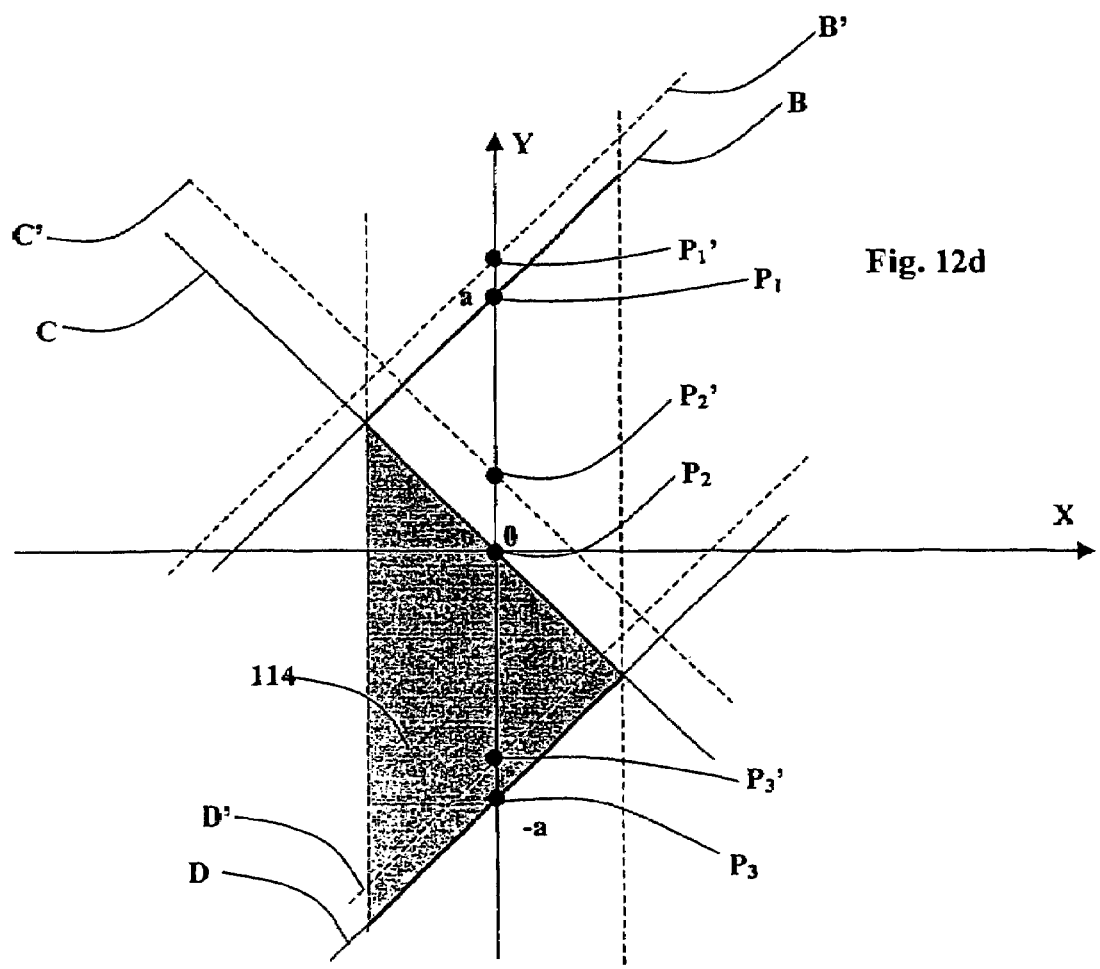

With reference to FIG. 12d, the sides of the triangles 114 shown in FIG. 12a are identified with the letters B, C, D, and are described by the equations of three straight lines lying on the plane of the liner surface $z=z_0$.

The equations of these straight lines are, respectively,

B: $y=x+a$;

C: $y=-x$;

D: $y=x-a$.

The parameter a is known because the shape of the triangles was determined in advance: in other words, the slopes and positions of the lines forming the triangles were determined with respect to the origin of the system of Cartesian axes. In particular, the system of Cartesian axes has its origin $P_0(0,0,0)$ in the centre of the lens 19 for collimating the rays reflected from the region comprising the triangles towards the CCD. By way of example, straight lines with an angular coefficient of one have been chosen in order to simplify the calculations. Within the scope of the present invention it is possible to construct triangles of different shapes, in other words those formed by straight lines with angular coefficients different from one.

In FIG. 12d, the image detected by the CCD is positioned along the y axis. In particular, the co-ordinates of the three points $P_1$, $P_2$ and $P_3$ are, respectively, $P_1(0, a, z_0)$;
$P_2(0, 0, z_0)$;
$P_3(0, -a, z_0)$ Let us assume that the tyre is subjected to a lateral displacement $X_2$, a longitudinal creep $X_3$ and a load or flattening $X_1$, also referred to above as $z_0$. The triangles are displaced by these amounts, and therefore the equations of the three straight lines representing the sides of the triangles, identified in the figure by B', C', and D', become:

$B': (y+x_3)=(x+x_2)+a;$ $C': (y+x_3)=-(x+x_2);$ $D': (y+x_3)=(x+x_2)-a.$

When the said straight lines intersect the y axis (equation x=0), it is possible to find the co-ordinates of the points $P_1'$, $P_2'$ and $P_3'$ which represent the displacements of the points $P_1$, $P_2$ and $P_3$ following the creep and displacement of the tyre. In particular, $P_1'\ (0, -x_3+x_2+a, x_1)$;
$P_2'\ (0, -x_3-x_2, x_1)$;
$P_3'\ (0, --x_3+x_2-a, x_1)$.

From equation (1) it is possible to find these points on the plane of the CCD. In particular, these points have the co-ordinates:

$(0, (x_3-x_2-a)z_1/x_1, z_1)$;
$(0, (x_3+x_2)z_1/x_1, z_1)$;
$(0, (x_3-x_2+a)z_1/x_1, z_1)$.

Three values $C_1$, $C_2$ and $C_3$, representing the discontinuities of reflection present at the points $P_1'$, $P_2'$ and $P_3'$ on the image plane, are found from the reading on the CCD.

These three values correspond to the points calculated previously on the plane of the CCD along the y axis. By relating the readings $C_1$, $C_2$ and $C_3$ to the co-ordinates of the points $P_1'$, $P_2'$ and $P_3'$ on the plane of the CCD along the y axis, we obtain:

$C_2=(x_3-x_2-a)z_1/x_1;$ (2)

$C_2=(x_3+x_2)z_1/x_1;$ (3)

$C_3=(x_3-x_2+a)z_1/x_1.$ (4)

The three relations shown above form a system of three equations and three unknowns ($x_1$, $x_2$ and $x_3$) from which it is possible to find the values of flattening $x_1$, lateral displacement $x_2$ and longitudinal creep $x_3$.

Additionally, from equation (3), by carrying out a derivation of $C_2$ with respect to $x_2$, a sensitivity to displacements in the lateral direction is determined and is equal to: $z_1/x_1$.

Additionally, from equation (3), by carrying out a derivation of $C_2$ with respect to $x_3$, a sensitivity to displacements in the longitudinal direction is determined and is equal to: $z_1/x_1$.

From equation (2) and (4), by carrying out a derivation of $C_2$ with respect to $x_1$, a sensitivity to vertical displacements is determined and is equal to: $a*z_1/x_1$.

The shapes and sizes of the triangles on the liner surface are determined by the selection of the parameters a and the angular coefficient of the three straight lines B, C and D, previously assumed to be equal to one. Assuming that a=1, the sensitivity is found to be equal to $z_1/x_1$ in the transverse and longitudinal directions.

Figure 13:
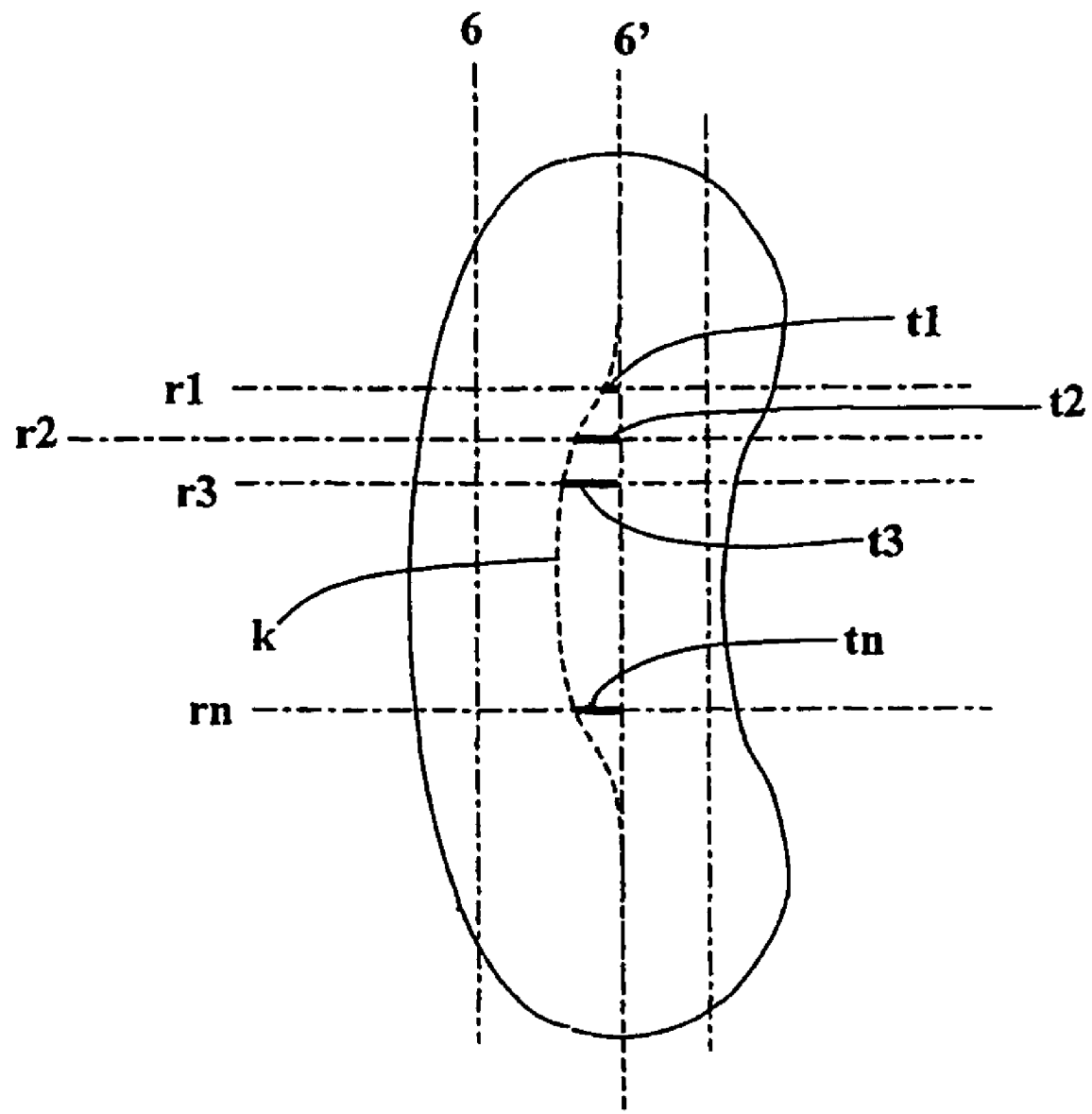
in FIG. 13, the footprint area of the tyre, modified to the shape of a bean during side-slip, with the paths of the bead wires, the mid-line of the tread and a set of radial planes, showing the corresponding value of deformation for each of these.

FIG. 13, which illustrates the bean-shaped deformation of the footprint area of the tyre during side-slip, depicting the paths of the bead wires 6, 6' and the mid-line k of the tread, shows how $x_2$ varies with the position, with respect to the said area, of the cross section (radial planes $r_1$, $r_2$, $r_3$, $r_4$) on which the measurement is made, moving from the value $t_1$ to $t_2$, then to $t_3$ and finally to $t_n$, along the longitudinal extension of the footprint area.

This variation can be measured by a series of successive determinations which are distributed over a period of time or distributed circumferentially along the said longitudinal extension.

It should be understood that the sensor and the reflective element described above can be replaced with equivalent effect, within the scope of the present invention, with other types of sensors and reflective elements capable of measuring the aforesaid parameters by the reflection of a signal within the tyre.

Alternatively, it is possible to mount a plurality of sensors on the rim, these sensors being preferably located in positions equidistant from each other, in such a way as to maintain a uniform distribution of the masses in the wheel, and each sensor being capable of measuring only one characteristic distance. Moreover, the number of the sensors can be such as to permit the determination of each characteristic value more than once during a complete rotation of the wheel. Preferably, the number of fixed coils located on the hub is equal to the number of sensors located on the rim.

Alternatively, a single sensor may be capable of measuring $X_1$, $X_2$ and $X_3$ simultaneously and sending, for example, a signal consisting of a first amplitude modulation for $X_1$ in a first time interval, a second amplitude modulation for $X_2$ in a second time interval, and a third amplitude modulation for $X_3$ in a third time interval. The set of three time intervals lies within the time interval used for the measurement.

The system of monitoring the deformed profile of the tyre preferably also comprises a pressure measuring device and/or a velocity and/or acceleration measuring device.

In a different embodiment, communication between the moving station and the fixed station is provided by means of radio waves, by including a suitable transmitter in the moving station and a suitable receiver in the fixed station.

The moving station is advantageously associated with the rim of the tyre, which forms an essential component for the determination of the deformations of the tyre.

It should be noted that the rim has normally been used only as the support for mounting devices capable of determining the pressure and/or temperature within the tyre, and has not had any significance in relation to the determination of the deformations of the tyre, and of the tread in particular. In the system of measuring the deformations according to the invention, the rim becomes the reference element, being the zero point, or in other words the centre of the system of Cartesian axes in which the dimensional variations of the tyre are measured in the three directions. The choice of the rim as the reference base is particularly advantageous because the rim is a rigid component of the pneumatic-tyred wheel, and is therefore essentially free of dimensional variations in its structure during the rotation of the tyre. In other words, the rigidity of the rim is the characteristic which allows it to be chosen as the fixed reference point on which the measurements made are based. Additionally, the surface of the rim permits easy access to the inner cavity of the tyre, thus facilitating the measurement of the deformations within the tyre.

EXAMPLE OF MEASUREMENT 1

The method of measuring a specific value in a tyre produced by the present Applicant is described, purely by way of example, with reference to FIGS. 11a and 11b. In particular, the value to be measured is the flattening $X_1$, corresponding to the distance d in FIG. 11a, of a tyre of the 195/65R15 grade, speed class V, in other words up to 240 km/hr, inflated to a pressure of 2.2 bars.

The distance d to be measured is of the order of 60 mm, the distance b is approximately 15 mm and the distance $d_1$ is approximately 9 mm.

For each millimetre of variation of the distance d, in other words of the flattening $X_1$, a value $s-s_0$ of approximately 40 µm is found. This value determines the sensitivity to displacement which the pair of diodes must have in order to measure variations of the distance d of the order of a millimetre.

The power supply to the fixed station is provided by the vehicle battery, at a voltage of 12 volts in particular, and the frequency of the power supply signal to the fixed coil is chosen to be approximately 1 MHz.

The maximum rotation velocity of the tyre may be 2500 r.p.m., and the measurement is to be made at this velocity. A fixed coil with a diameter of approximately 10 cm and a moving coil with a diameter of approximately 2 cm are chosen, with a gap of approximately 7 mm between the two coils. With a fixed coil of elliptical shape, the arc of the rim in which the two coils are completely facing each other is approximately 12 cm long. At a velocity of 2500 r.p.m., the useful measurement interval, in other words that in which the moving coil is acted on by the magnetic field generated by the fixed coil, is approximately 720 µs.

The power supply circuit 32 of the moving station 30 is designed in; such a way that it has a charging time of not more than 100 µs. In the next 200 µs, the LED, being correctly powered, emits an optical beam of infrared light. In the next 100 µs, the optical beam emitted by the LED is reflected from the surface of the tyre and captured by the pair of p-i-n diodes, after which the reading circuit 37 reads the measurement received from the said pair of diodes.

The total darkness present in the cavity of the tyre facilitates the reflection of the optical beam and its reception by the p-i-n diodes. The quantity of light which is reflected from the surface of the tyre is approximately 10% of the quantity of light emitted by the LED; the quantity of light received by the pair of p-i-n diodes is approximately 10% of the quantity of light reflected from the tyre. The emission power of the LED is approximately 1.5 mW, and therefore the total optical power received by the p-i-n diodes is approximately 1.5 µW. The sensitivity of the p-i-n diodes used is approximately 0.5 A/W, and therefore the current generated by the said diodes is approximately 0.75 µA.

The quantity of light emitted by the LED can conveniently be controlled by varying the power of the supply circuit 32, in such a way as to enable the p-i-n diodes to receive an optimal quantity of light.

During the final 200 µs of the time period used for making the measurement, the signal emitted by the reading circuit is transmitted to the fixed station by means of the antenna, and separated from the carrier wave in the fixed station by means of the demodulator 27.

Preferably, a computer installed on board the vehicle interprets the received signal, makes it available to the user in an understandable language, activates any information or alarm devices, and uses it to activate any automatic devices for controlling the attitude of the vehicle.

EXAMPLE OF MEASUREMENT 2

The method of measuring the aforesaid values in a tyre produced by the present Applicant, of the 195/65R15 grade, speed class V, in other words up to 240 km/hr, inflated to a pressure of 2.2 bars, is described, purely by way of example, with reference to FIGS. 12a, 12b, 12c and 12d.

The power supply to the fixed station is provided by the vehicle battery, at a voltage of 12 volts in particular, and the frequency of the power supply signal to the fixed coil is chosen to be approximately 1 MHz.

The maximum rotation velocity of the tyre may be 2500 r.p.m., and the measurement is to be made at this velocity. A fixed coil of elliptical shape having a major axis of approximately 10 cm and a moving coil of elliptical shape having a major axis of approximately 2 cm are chosen; the arc of the rim along which the two coils are completely facing each other is approximately 10 cm, and the gap between the two coils is approximately 3 cm. At a velocity of 2500 r.p.m., the useful measurement interval, in other words that in which the moving coil is completely acted on by the magnetic field generated by the fixed coil, is approximately 720 µs.

The power supply circuit 32 of the moving station 30 is designed in such a way that it has a charging time of not more than 100 µs. In the next 300 µs, the LED is correctly powered and emits an optical beam of infrared light, and at the same time the optical beam emitted by the LED is received and the measurement is read by the reading circuit 37.

The quantity of light which is reflected from the surface of the tyre is approximately 10% of the quantity of light emitted by the LED. Additionally, the quantity of light received by the CCD element as a whole is approximately 10% of the quantity of light reflected from the tyre. The emission power of the LED is approximately 1.5 mW, and therefore the total optical power received by the CCD element is approximately 1.5 µW. Each of the photodiodes of the CCD element therefore receives 1.5/n µW, where n is the total number of photodiodes.

The sensitivity of the photodiodes used is approximately 0.5 A/W, and therefore the current generated by them is approximately 0.75/n µA, where n is the number of photodiodes contained in the CCD.

During the final 300 µs used for making the measurement, the signal emitted by the reading circuit is retransmitted to the fixed station by means of the antenna, and separated from the carrier wave by means of the demodulator 27.

A tyre of the type described above by way of example, inflated to the pressure of 2.2 bars and fitted on a vehicle, has a vertical measurement distance of approximately 60 mm when the vehicle is stationary. The sensor described by way of example has a distance of approximately 6 mm between the second lens 19 and the CCD 18. Given these assumptions, the Applicant has observed that, for displacements on the tyre surface of the order of a millimetre in the lateral and longitudinal directions, the displacement of the light points on the surface of the CCD is approximately 0.1 mm. A CCD suitable for the described example must therefore have a sensitivity of the order of a tenth of a millimetre. To use CCDs with lower sensitivity, it is possible to increase the size of the triangles formed on the liner surface 111.

Additionally, the described example of measurement is based on the measurement of three points of discontinuity, in other words points of passage from a surface of high reflectivity to one of low reflectivity, or from a surface of low reflectivity to one of high reflectivity, which represent the minimum of points to be detected to obtain the measurement of $X_1$, $X_2$ and $X_3$. To improve the quality of the measurement, it is possible to detect a greater number of points of discontinuity, in order to obtain a number of measurements of $X_1$, $X_2$ and $X_3$ greater than one in each case. After this, a subsequent processing of these sets of three measurements can be carried out, advantageously within the sensor itself or alternatively in a processor external to the wheel, a mean of these measurements can be found, and the standard deviation can be calculated in order to reject any inaccurate measurements which may be affected, for example, by a misalignment between the CCD and the triangles formed on the liner surface.

Additionally, the measurements which are made are preferably expressed as variations of longitudinal creep, variations of lateral displacement and variations of load with respect to a measurement made on the base figure, particularly on the region containing the aforesaid triangles in static conditions. The measurements of $X_1$, $X_2$ and $X_3$ which are made dynamically are compared with this base measurement in such a way that the variation of the forces acting on the tyre can be determined.

Advantageously, as mentioned above, further sensors capable of measuring, for example, the pressure, the temperature and the number of revolutions of the tyre can be fitted in the moving station. These sensors are advantageously fitted in the electronic circuit board used to control the optical elements, in such a way that they are activated in the same way as the optical elements.

Finally, the attention of the skilled person is drawn to the fact that the moving station, in the described embodiment, takes the form of a cylinder with a height of several centimeters. Since this cylinder projects radially from the surface of the rim towards the interior of the wheel cavity, it forms an element which interferes with the beads of the tyre during the stage of fitting the said tyre on the rim. In other words, the moving stations do not allow the beads to slide axially along the surface of the rim until they reach the corresponding bead seats and bear on the flanges of the rim.

The moving stations must therefore be removed during the operation of fitting the tyre on the rim: in practice, the operation of fitting a tyre on a rim designed to house at least one moving station according to the present invention is carried out in the following steps:

- an airtight sealing element is inserted in each hole present on the rim for housing the moving stations, this element generally being a screw plug interchangeable with the said station;
- the tyre is fitted on the rim by making the beads of the tyre pass in succession over the same flange of the rim and bringing the said beads to the start of the conical surfaces which axially delimit the inner edges of the bead seats;
- pressurized air is admitted to the tyre in such a way that each bead is brought on to the corresponding bead seat, and bears on the said flanges located at the axially opposite edges of the rim;
- the tyre is deflated and the sealing elements are replaced with the moving stations;
- the tyre is inflated to the desired pressure.

The sealing elements are only required to ensure airtightness, to allow the beads to be forced into the corresponding seats, and therefore they do not need to project radially into the cavity of the tyre: thus they allow the beads of the tyre to slide easily over the surface of the rim until they reach the specified fitting position.

The invention claimed is:

1. A system for monitoring deformations of a moving tyre fitted on a rim associated with a vehicle, comprising:
    a moving station associated with the rim; and
    a fixed station associated with the vehicle;
    wherein the moving station comprises:
        a device for measuring the deformations in at least one predetermined direction;
        a unit for supplying power to the measuring device; and
        a switch configured to sense a motion of the tyre and selectively supply the power to the measuring device in response to the sensed motion;
    wherein the fixed station receives information related to the deformation measurements from the moving station.

2. The system of claim 1, wherein the fixed station activates the moving station to measure the deformations.

3. The system of claim 1, wherein the fixed station supplies electrical energy to the moving station.

4. The system of claim 1, wherein the deformations are measured at least once during each revolution of the rim.

5. The system of claim 1, wherein the fixed station comprises:
    a fixed antenna;
    wherein the fixed antenna communicates with a moving antenna of the moving station.

6. The system of claim 5, wherein the fixed antenna and the moving antenna are inductively coupled to each other.

7. The system of claim 1, wherein the measuring device comprises:
    an optical beam emitting device;
    a first lens;
    an optical beam receiving device; and
    a second lens.

8. The system of claim 7, wherein the measuring device further comprises:
    a reflective element;
    wherein the reflective element is disposed on an inner surface of the tyre, and
    wherein the reflective element comprises:
        a region, comprising:
            at least one area of high light reflection; and
            at least one area of low light reflection.

9. The system of claim 8, wherein the at least one area of high light reflection is produced by coating at least a portion of the inner surface of the tyre with a reflective paint.

10. The system of claim 8, wherein the region comprises a plurality of triangles adjacent to each other.

11. The system of claim 7, wherein the moving station comprises:
    a first drive circuit for the optical beam emitting device;
    a second drive circuit for the optical beam receiving device; and
    a circuit for reading an electrical signal from the optical beam receiving device.

12. The system of claim 1, wherein the fixed station comprises:
    a supporting element; and
    an electronic circuit board;
    wherein the supporting element is fixed to a hub on which the rim is fitted, and wherein the electronic circuit board is fixed to the supporting element.

13. The system of claim 12, wherein the electronic circuit board comprises:
an oscillator circuit;
a radio frequency receiver; and
an electrical demodulator device;
wherein the oscillator circuit supplies a drive circuit for a fixed antenna,
wherein the radio frequency receiver is connected to the fixed antenna, and
wherein the electrical demodulator device is connected to the radio frequency receiver.

14. The system of claim 1, wherein a battery of the vehicle supplies electrical energy to the fixed station.

15. The system of claim 1, wherein the power supply unit is a battery.

16. The system of claim 1, wherein the moving station further comprises a sensor that measures a pressure of the tyre.

17. The system of claim 1, wherein the moving station further comprises a sensor that measures a temperature of the tyre.

18. The system of claim 1, wherein the switch includes an accelerometric switch.

19. A method for monitoring deformations of a moving tyre fitted on a rim associated with a vehicle, comprising:
sensing a motion of the tyre with a switch, the switch being coupled to a power supply in a moving station, the moving station being associated with the rim;
selectively supplying power with the switch to the moving station;
activating the moving station to measure the deformations with the power supplied from the power supply; and
receiving information related to the deformation measurements.

20. The method of claim 19, wherein activating the moving station includes supplying electrical energy from a fixed station associated with the vehicle to the moving station associated with the rim.

21. The method of claim 19, wherein measuring the deformations comprises:
emitting a signal, from a predetermined position relative to the rim, in at least one predetermined direction within the tyre;
reflecting the signal from an inner surface of the tyre; and
receiving the reflected signal.

22. The method of claim 19, wherein receiving information related to the deformation measurements comprises transferring information related to the deformation measurements from the moving station to the fixed station.

23. The method of claim 19, wherein activating the moving station comprises:
supplying the power to the moving station for a period of time; and
transferring information related to the deformation measurements from the moving station to a fixed station during the period of time.

24. The method of claim 23, wherein transferring information related to the deformation measurements comprises:
generating a magnetic field at the moving station in a direction of the fixed station;
converting the magnetic field into an electrical signal; and
decoding the electrical signal to obtain a processed signal;
wherein the magnetic field corresponds to a signal reflected from an inner surface of the tyre.

25. The method of claim 19, wherein activating the moving station comprises:
generating a magnetic field at a fixed station in a direction of the moving station; and
using the magnetic field to supply the power to a drive circuit for an optical beam emitting device of the moving station.

26. A wheel for a vehicle, comprising:
a tyre;
a rim; and
a moving station associated with the rim;
wherein the tyre is fitted on the rim, and
wherein the moving station comprises:
a device for measuring deformations of the tyre in at least one predetermined direction;
a unit for supplying power to the measuring device; and
a switch configured to sense a motion of the tyre and selectively supply the power to the measuring device in response to the sensed motion.

27. The wheel of claim 26, wherein a fixed station activates the moving station to measure the deformations.

28. The wheel of claim 26, wherein the power supply unit is a battery.

29. The wheel of claim 18, wherein the moving station further comprises a sensor that measures a pressure of the tyre.

30. The wheel of claim 18, wherein the moving station further comprises a sensor that measures a temperature of the tyre.

31. The wheel of claim 18, wherein the switch includes an accelerometric switch.

32. A system for monitoring deformations of a moving tyre fitted on a rim associated with a vehicle, comprising:
a moving station associated with the rim; and
a fixed station associated with the vehicle;
wherein the moving station comprises:
a device for measuring the deformations in at least one predetermined direction;
a unit for supplying power to the measuring device; and
a device for enabling the unit to supply the power,
wherein the fixed station receives information related to the deformation measurements from the moving station,
wherein the measuring device comprises:
an optical beam emitting device;
a first lens;
an optical beam receiving device; and
a second lens.

33. The system of claim 32, wherein the measuring device further comprises:
a reflective element;
wherein the reflective element is disposed on an inner surface of the tyre, and
wherein the reflective element comprises:
a region, comprising:
at least one area of high light reflection; and
at least one area of low light reflection.

34. The system of claim 33, wherein the at least one area of high light reflection is produced by coating at least a portion of the inner surface of the tyre with a reflective paint.

35. The system of claim 33, wherein the region comprises a plurality of triangles adjacent to each other.

36. The system of claim 32, wherein the moving station comprises:
a first drive circuit for the optical beam emitting device;
a second drive circuit for the optical beam receiving device; and a circuit for reading an electrical signal from the optical beam receiving device.

37. A system for monitoring deformations of a moving tyre fitted on a rim associated with a vehicle, comprising:
a moving station associated with the rim; and
a fixed station associated with the vehicle;
wherein the moving station comprises:
a device for measuring the deformations in at least one predetermined direction;
a unit for supplying power to the measuring device; and
a device for enabling the unit to supply the power,
wherein the fixed station receives information related to the deformation measurements from the moving station,
wherein the fixed station comprises:
a supporting element, and
an electronic circuit board,
wherein the supporting element is fixed to a hub on which the rim is fitted, and
wherein the electronic circuit board is fixed to the supporting element.

38. The system of claim 37, wherein the electronic circuit board comprises:
an oscillator circuit;
a radio frequency receiver; and
an electrical demodulator device;
wherein the oscillator circuit supplies a drive circuit for a fixed antenna,
wherein the radio frequency receiver is connected to the fixed antenna, and
wherein the electrical demodulator device is connected to the radio frequency receiver.

39. system for monitoring deformations of a moving tyre fitted on a rim associated with a vehicle, comprising:
a moving station associated with the rim; and
a fixed station associated with the vehicle;
wherein the moving station comprises:
a device for measuring the deformations in at least one predetermined direction;
a unit for supplying power to the measuring device; and
a device for enabling the unit to supply the power,
wherein the fixed station receives information related to the deformation measurements from the moving station, and
wherein the enabling device is an accelerometric switch.

40. A method for monitoring deformations of a moving tyre fitted on a rim associated with a vehicle, comprising:
enabling a moving station associated with the rim;
activating the moving station to measure the deformations with power supplied from a power supply included in the moving station; and
receiving information related to the deformation measurements,
wherein measuring the deformations comprises:
emitting a signal, from a predetermined position relative to the rim, in at least one predetermined direction within the tyre;
reflecting the signal from an inner surface of the tyre; and
receiving the reflected signal.

41. A method for monitoring deformations of a moving tyre fitted on a rim associated with a vehicle, comprising:
enabling a moving station associated with the rim;
activating the moving station to measure the deformations with power supplied from a power supply included in the moving station; and
receiving information related to the deformation measurements,
wherein activating the moving station comprises:
generating a magnetic field at a fixed station in a direction of the moving station; and
using the magnetic field to supply the power to a drive circuit for an optical beam emitting device of the moving station.

42. A method for monitoring deformations of a moving tyre fitted on a rim associated with a vehicle, comprising:
enabling a moving station associated with the rim;
activating the moving station to measure the deformations with power supplied from a power supply included in the moving station; and
receiving information related to the deformation measurements,
wherein activating the moving station comprises:
supplying the power to the moving station for a period of time; and
transferring information related to the deformation measurements from the moving station to a fixed station during the period of time,
wherein transferring information related to the deformation measurements comprises:
generating a magnetic field at the moving station in a direction of the fixed station;
converting the magnetic field into an electrical signal; and
decoding the electrical signal to obtain a processed signal, and
wherein the magnetic field corresponds to a signal reflected from an inner surface of the tyre.

* * * * *

UNITED STATES PATENT AND TRADEMARK OFFICE
CERTIFICATE OF CORRECTION

PATENT NO. : 7,150,187 B2
APPLICATION NO. : 10/432221
DATED : December 19, 2006
INVENTOR(S) : Caretta It is certified that error appears in the above-identified patent and that said Letters Patent is hereby corrected as shown below:

Claim 39, column 23, line 33, "39. system", should read --39. A system--.

Signed and Sealed this

Nineteenth Day of August, 2008

JON W. DUDAS
*Director of the United States Patent and Trademark Office*